106/90

United States Patent [19]

Nicholson et al.

[11] Patent Number: 4,488,910

[45] Date of Patent: Dec. 18, 1984

[54] ADMIXTURE FOR NONPLASTIC CEMENT MIXES AND METHOD

[75] Inventors: Richard R. Nicholson, Lyndhurst; Sally L. Vista, Euclid; Reynold A. Berkey, Painesville, all of Ohio

[73] Assignee: Martin Marietta Corporation, Bethesda, Md.

[21] Appl. No.: 552,528

[22] Filed: Nov. 16, 1983

[51] Int. Cl.³ .......................... C04B 7/35; C04B 7/352
[52] U.S. Cl. ........................................ 106/90; 106/92; 106/314
[58] Field of Search ............................ 106/92, 93, 314

[56] References Cited

U.S. PATENT DOCUMENTS

| | | | |
|---|---|---|---|
| 3,090,692 | 5/1963 | Kelly et al. | 106/92 |
| 3,885,985 | 5/1975 | Serafin et al. | 106/92 |
| 4,210,456 | 7/1980 | Miller | 106/92 |
| 4,224,076 | 9/1980 | Moitra et al. | 106/97 |
| 4,286,992 | 9/1981 | Galer et al. | 106/92 |

Primary Examiner—James Poer
Attorney, Agent, or Firm—Bruce M. Winchell; Gay Chin; Herbert W. Mylius

[57] ABSTRACT

A hydraulic cement mix including hydraulic cement, aggregate, sufficient water to effect hydraulic setting of the cement, and an admixture comprising a mixture selected from an olefin sulfonate, an alkylarylsulfonate, an alkyloamide, an ethoxylated fatty amine, an alkanolamine, and a hydrolyzed starch having a dextrose equivalent value in the range of commercial corn syrups, the admixture being present in an amount sufficient to increase the compressive strength of nonplastic cementitious mixes such as those used in making masonry units, pipe and the like. Generally, the additive is present in an amount between 0.005 and 0.5 weight percent based on weight of cement.

18 Claims, No Drawings

ADMIXTURE FOR NONPLASTIC CEMENT MIXES AND METHOD

BACKGROUND OF THE INVENTION

This invention relates to admixtures for incorporation into hydraulic cement mixes which are nonplastic by virtue of low water contents per unit volume, such as those used in making masonry units, pipe and the like. Examples are concrete block, concrete pipe and other concrete products and structures. Such nonplastic mixes contain portland cement, optionally pozzolanic additions, aggregate and water, yet they differ significantly from conventional highly-workable plastic mixes, which contain relatively much greater proportions of water, and normally set and harden under ambient conditions. In contrast, nonplastic mixes are mechanically forced into molds and set and harden under the influence of steam and elevated temperatures. Because of these differences, the problems encountered with the two types of cementitious mixes differ significantly.

Thus, admixtures developed for use in plastic cementitious mixes are often unsuitable for use in nonplastic mixes, and vice versa. For example, the water-reducing and plasticizing agents employed with plastic mixes may not be applicable to nonplastic mixes, and admixtures which perform in plastic mixes as air-entraining agents do not act in this manner in nonplastic mixes. Conversely, admixtures suitable for use in nonplastic mixes may have adverse effects, for example with respect to air entrainment, in plastic mixes.

A desirable admixture for a nonplastic mix intended for production of a masonry unit, for example, would be one which would increase the ultimate strength of the masonry unit at a given cement content, or, conversely, result in a unit of equal strength in a mix having a lower unit cement content. One factor of importance to strength attained by a manufactured masonry unit, but of no pertinence to strength development in plastic mixes, is friction between the nonplastic mass and the forms through which it is forced in the manufacturing process. For a given force, an increase in this friction would increase the molding time per unit, as well as increase abrasive wear on equipment surfaces.

Accordingly, an admixture that increases the lubricity of the nonplastic mix is highly desirable, preferably while also increasing compressive strength of the unit, but in any case, while having no significantly deleterious effect on strength of the unit.

A problem with manufacture masonry units, particularly block, is a surface discoloration, or a lack of uniformity of surface color and texture. In many instances admixtures that are used to increase strength in plastic cementitious systems are not suitable for use in nonplastic systems because of deleterious effects on uniformity of surface texture and color.

Admixtures known in the art and which significantly increase compressive strength of the nonplastic mix after hardening include specific combinations of a carbohydrate and an alkanolamine; and three-component admixtures containing these components plus an anionic surfactant; and a combination of a carbohydrate and a nonionic surfactant; and a carbohydrate plus an anionic surfactant plus a nonionic surfactant; and a combination of anionic and nonionic surfactant; and a combination of an alkanolamine and an anionic and a nonionic surfactant. Various combinations selected from these currently are being commercialized.

U.S. Pat. No. 4,224,076, issued to Moitra and Rosskopf, discloses for nonplastic cementitious mixes an admixture consisting of a methyl or ethyl substituted benzene or naphthalene sulfonate salt in combination with a tertiary aliphatic amine oxide.

Many of the admixtures for nonplastic mixes known in the art have limitations in terms of stability, relatively limited enhancement of compressive strength of the hardened units, or promotion of unfavorable aesthetic effects of the hardened unit, such as surface discolorations.

SUMMARY OF THE INVENTION

The present invention provides a group of new admixture combinations which, when incorporated into nonplastic concrete mixes cause these mixes to become more dense and cohesive which in turn causes the concrete units to have substantially improved early and ultimate strength. Such units also have a desirable high degree of uniformity of surface color and texture. Further, employment of admixtures of the present invention reduces friction between the nonplastic mixes and the molds and other production equipment which mixes encounter during manufacture.

The admixture composition of the present invention comprises combinations selected from a set of four chemical classes, namely, alkanolamines, anionic surfactants, nonionic surfactants and carbohydrates. In particular, certain anionic surfactants in combination with certain nonionic surfactants are very effective. Likewise, three component combinations of selected alkanolamines, anionic surfactants and nonionic surfactants, are effective, as well as particular compounds selected from all four classes and employed in combination. While these classes and certain combinations are broadly known in the art, the invention resides in the particular identities and combinations that are novel and in which unexpected and nonobvious synergistic interactions have been shown to occur.

Alkanolamine is a generic term for a group of compounds in which trivalent nitrogen is attached directly to a carbon atom of an alkyl alcohol, and examples are diethanolamine, triethanolamine and isopropanolamine. The particular anionic surfactant of the present invention are alpha olefin sulfonates commercially available from Witco Chemical Company under the trademark SULFRAMIN AOS. The nonionic surfactants of the present invention are not those known in the art, but are alkylolamides prepared by reaction of a fatty acid amide with ethylene oxide to yield compounds of the type shown below:

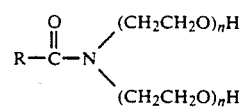

where R is the alkyl group of a fatty acid which may be branched or unbranched, saturated or unsaturated and having a chain length generally in the range of 10 to 20 carbon atoms, and n is preferably 1 or 2 and if 2 or more may be in a branched or unbranched chain. Thus, one could use, for example, either diisopropanolamine or dipropanolamine as the reactant with the fatty acid. The combination of alkylolamides with the illustrated type of anionic surfactant has been found to interact synergistically with respect to enhancement of compressive strength of nonplastic cementitious mixes after hardening. Another type of nonionic surfactant that acts in this way is certain ethoxylated fatty amines. The carbohydrates employed in the present invention are monosaccharides, disaccharides, glucose oligomers and water-soluble glucans. An advantage of employing an alkylolamide as the nonionic surfactant relative to the prior art tertiary amine oxide is that the former will not decompose on contact with iron containers. Also, if an alkali alpha olefin sulfonate is chosen as the anionic surfactant there is the additional benefit of eletrolyte tolerance which provides improved stability in the presence of deliberate addition or accidental contamination by ionizing salt, such as calcium chloride.

The carbohydrate component is normally employed in the range of 0.05 to 0.10 weight percent of cement on a solids basis; the alkanolamine is normally employed in the range of 0.01 to 0.05 weight percent of cement; the anionic surfactant normally is employed in the range of 0.005 to 0.010 weight percent of cement; and the nonionic surfactant normally is employed in the dosage range of 0.005 to 0.010 weight percent of cement.

The preferred hydraulic cement for use in the present invention is portland-type cement and the cementitious mix may include an aggregate such as sand and crushed stone or gravel, and may optionally include a pozzolanic material such as fly ash, and enough water to effect hydraulic setting of said cement.

It is an object of the present invention to provide nonplastic cementitious mixes with improved early and ultimate strength.

A further object is to provide such nonplastic mixes which reduce the friction between the mixes and the equipment used in converting such mixes into masonry units.

These and other objects and advantages of the invention will become apparent on consideration of the discussion which follows.

DESCRIPTION OF THE PREFERRED EMBODIMENT

The group of admixtures of the present invention may be categorized as three types which may be designated anionic surfactant-nonionic surfactant type; and alkanolamine-anionic surfactant-nonionic surfactant type; and anionic surfactant-nonionic surfactant-alkanolamine-carbohydrate type.

The anionic surfactant-nonionic surfactant type of admixture in terms of particular examples is known in the art as previously indicated. However, we have found that particular members of these classes in particular proportions act in a strongly synergistic manner in nonplastic cementitious mixes.

The admixture of the present invention is advantageously incorporated into hydraulic cement mixes by adding it to a portion of the mix water in preparing the mix. However, the additive could be incorporated into the dry cement powder or in any other convenient manner.

For purposes of this invention the term "hydraulic cement" is intended to mean and to include all cementitious compositions capable of being set and hardened by the action of water; such as portland cements, pozzolanic cements and high-alumina cements. The term "cement mix" is intended to include combinations of cement, aggregate, water, and admixtures where appropriate. The admixtures of the present invention are preferably used in portland type mixes, including portland cements and portland blended hydraulic cements such as those described in ASTM Standard C 595-74.

The term aggregate is intended to include fine aggregate such as sand, and coarse aggregate, such as crushed stone or gravel, as is common in the art and would, in general meet the requirements of ASTM Standard C 33. The proportions of fine and coarse aggregate will vary, depending on the desired use and properties of the cement mix.

Good results are obtained with combinations of aggregate comprising about 40% to 75% by weight of fine aggregate and 60% to 25% by weight coarse aggregate, depending on the desired properties of the mix. The proportion of cement in the mix will depend on the desired strength of the product and for concrete block will commonly be a 1 to 10 weight ratio of cement to aggregate. The amount of water employed should be enough to effect hydraulic setting of the cement present in the mix and to moisten the mix. For concrete blocks the water to cement ratio by weight is usually about 0.5.

To demonstrate the effectiveness of the admixture combinations in accordance with the present invention, cement mixes were made as follows: A total of 41.0 pounds of sand and coarse aggregate and 4.05 pounds of portland cement were used in the mix. The plain reference mix, containing no admixtures, contained about 2.0 pounds of water. The water in the mixes containing admixtures was adjusted to give the mixes the desired consistency. The specimens were cured at a maximum temperature of 130° F. and 95% relative humidity, the maintained in storage at 73° F. and 50% relative humidity until the indicated ages for testing of compressive strength. The novel nonionic surfactant, an alkylolamide, is commercially available from Finetex, Incorporated under the trademark AMINOL COR-2. In Table 1 and in subsequent tables it is designated "Cocamide DEA." The anionic surfactant employed was sodium alpha olefin sulfonate, commercialy available from Witco Chemical Company under the trademark SULFRAMIN AOS, and designated in Table 1 and in subsequent tables as "Sulframin."

TABLE 1

| Mix No. | Admixture, Wt % Of Cement | Compressive Strength, % of Within-Group Plain Mix | |
|---|---|---|---|
| | | 1-day | 7-days |
| 1. | Cocamide DEA, .016 | 111 | 104 |
| 2. | Sulframin, .016 | 122 | 128 |
| 3. | Cocamide DEA, .008 + Sulframin, .008 | 131 | 132 |
| 4. | Cocamide DEA, .032 | 113 | 108 |
| 5. | Sulframin, .032 | 135 | 140 |
| 6. | Cocamide DEA, .016 + Sulframin, .016 | 143 | 153 |

The data Mixes 1 through 3 show that at a fixed admixture dosage of 0.016 weight percent of cement, there is a synergistic interaction of the anionic and nonionic surfactant with respect to effect on compressive strength of the specimens. The data pertaining to Mixes 4 through 6 show that the same is true at the fixed admixture dosage of 0.032 weight percent of cement.

The tests described above were repeated, with all conditions remaining the same except that the aggregate to cement weight ratio was 6.55, instead of 10.1 as in the first case. The data secured are shown in Table 2.

TABLE 2

| Mix No. | Admixture, Wt % Of Cement | Compressive Strength, % of Within-Group Plain Mix | |
|---|---|---|---|
| | | 1-day | 7-days |
| 1. | Cocamide DEA, .016 | 99 | 99 |
| 2. | Sulframin, .016 | 110 | 111 |
| 3. | Cocamide DEA, .008 + Sulframin, .008 | 121 | 118 |
| 4. | Cocamide DEA, .032 | 98 | 99 |
| 5. | Sulframin, .032 | 119 | 112 |
| 6. | Cocamide DEA, .016 + Sulframin, .016 | 117 | 116 |

The data of Table 2 again demonstrate the synergistic effect on compressive strength of the anionic and nonionic surfactant at the two fixed dosage levels.

Similar experiments were conducted, in which 22% of the cement was replaced by fly ash, but the dosage rate of the admixtures was computed with respect to cement plus fly ash. The aggregate to cement weight ratio was 5.90. The specimens were cured at 130° F., as before. Data were secured as shown in Table 3.

TABLE 3

| Mix No. | Admixture, Wt % Of Cement | Compressive Strength, % of Within-Group Plain Mix | |
|---|---|---|---|
| | | 1-day | 7-days |
| 1. | Cocamide DEA, .010 + Sulframin, .010 (total dose = .020) | 113 | 120 |
| 2. | Sodium dodecylbenzene sulfonate, .009 + ethoxylated octylphenol, .015 (total dose = .024) | 101 | 104 |
| 3. | Cocamide DEA, .015 + Sulframin, .015 (total dose = .030) | 116 | 119 |
| 4. | Sodium dodecylbenzene sulfonate, .0135 + ethoxylated octylphenol, .02256 (total dose = .036) | 95 | 105 |

The admixtures in Mix 2 are known in the art and are in commercial use and may be compared to effects of admixtures of this invention, as shown in Mix 1. Although the prior art admixtures are given a dosage advantage, the admixtures of this invention are clearly superior in effect on compressive strength. The same effect is seen at a higher dosage, as shown in Mixes 3 and 4.

Similar benefits relative to benefits of a prior art anionic-nonionic surfactant combination in commercial use are realized with the surfactants of this invention, when blast furnace slag is substituted for significant proportions of portland cement in a mix.

In Table 4 data are shown for a series of tests made under the same conditions as previously described except that the indicated substitutions of slag for cement were made and the compressive strength effects are referenced to a plain mix containing cement only.

TABLE 4

| Mix No. | Admixture, Wt % Of Cement | Compressive Strength, % of Within-Group Plain Mix | |
|---|---|---|---|
| | | 1-day | 7-days |
| A. Slag Substituted For 35% of Cement, By Weight | | | |

TABLE 4-continued

| Mix No. | Admixture, Wt % Of Cement | Compressive Strength, % of Within-Group Plain Mix | |
|---|---|---|---|
| | | 1-day | 7-days |
| 1. | Cocamide DEA, .010 + Sulframin, .010 (total dose, .020) | 153 | 143 |
| 2. | Sodium dodecylbenzene sulfonate, .009 + ethyoxylated octylphenol, .015 | 127 | 117 |
| B. Slag Substituted For 65% of Cement By Weight | | | |
| 3. | Cocamide DEA, .010 + Sulframin, .010 | 136 | 136 |
| 4. | Sodium dodecylbenzene sulfonate, .009 + ethoxylated octylphenol, .015 (total dose, .024) | 118 | 116 |

As seen in Table 4, even though the prior art admixtures shown in Mixes 2 and 4 are given a dosage advantage, the surfactant combination of this invention is again significantly superior in effect on compressive strength of the specimens.

The anionic-nonionic surfactant combination of this invention may still further enhance compressive strength of nonplastic cementitious mixes when used in combination with alkanolamines, as shown in Table 5. These tests were made in the same manner as previously described, using portland cement without substitutions and curing at 73° F. and 100% relative humidity.

TABLE 5

| Mix No. | Admixture, Wt % Of Cement | Compressive Strength, % of Within-Group Plain Mix 7-days |
|---|---|---|
| 1. | Cocamide DEA, .01 + Sulframin, .01 | 161 |
| 2. | Cocamide DEA, .01 + Sulframin, .01 + Isopropanolamine, .05 | 177 |

Mix 2 in Table 5 is illustrative of what was previously designated alkanolamine-anionic surfactant-nonionic surfactant combinations. Another example of enhancement of the effect on strength by adding an alkanolamine as a third component is illustrated by data in Table 6 which were obtained under test conditions similar to those already described.

TABLE 6

| Mix No. | Admixture, Wt % Of Cement | Compressive Strength, % of Within-Group Plain Mix 7-days |
|---|---|---|
| 1. | Cocamide DEA, .005 + Sulframin, .005 | 139 |
| 2. | Same as Mix 1 + diethanolamine | 143 |
| 3. | Same as Mix 1 + diisopropanolamine, .0165 | 143 |

As mentioned earlier, nonionic surfactants comprising certain ethoxylated fatty amines act synergistically with the anionic surfactants of this invention to impart unexpectedly high compressive strength to nonplastic cementitious mixes. An example is an oxyethylated cocomonoamine. The particular one chosen as an example has a 12-carbon chain and is designated Ethomeen C/12 and was tested in the manner previously described with results as shown in Table 7.

TABLE 7

| Mix No. | Admixture, Wt % Of Cement | Compressive Strength, % of Within-Group Plain Mix 6-days |
|---|---|---|
| 1. | None | Reference (100) |
| 2. | Sulframin, .01 + Ethomeen C/12, .01 | 170 |

It has also been found that when certain carbohydrates are added, making four component admixture systems, there is a very significant improvement in the compressive strength of nonplastic mixes. The beneficial effects of such four component admixtures are shown by data in Table 8 which are obtained under test conditions similar to those already described.

TABLE 8

| Mix No. | Admixture, Wt % Of Cement | Compressive Strength, % of Within-Group Plain Mix 7-days |
|---|---|---|
| 1. | Cocamide DEA, .01 + Sodium dodecylbenzene sulfonate, .01 + Hydrolyzed starch, .07 + Isopropanolamine, .03 | 151 |
| 2. | Cocamide DEA, .01 + Sodium lauryl sulfate, .01 + Hydrolyzed starch, .07 + Isopropanolamine, .03 | 155 |
| 3. | Cocamide DEA, .01 + Sodium methyl oleoyl taurate, .01 + Hydrolyzed starch, .07 + Isopropanolamine, .03 | 146 |
| 4. | Cocamide DEA, .01 + Sulframin, .01 + Hydrolyzed starch, .07 + Isopropanolamine, .03 | 145 |

In Table 8, the particular hydrolyzed starch employed is commerical corn syrup having a dextrose equivalent value of about 42, but other starches hydrolyzed more or less than this also would work. For example, the much less hydrolyzed starches known as dextrins have long been known in the art as admixtures for nonplastic concretes.

The desirability of adding the additional components, namely, carbohydrates and alkanolamines, to the basic anionic-nonionic surfactant combination of this invention is more clearly seen from the data in Table 9, wherein the corresponding tests were conducted under conditions like those already described.

TABLE 9

| Mix No. | Admixture, Wt % Of Cement | Compressive Strength, % of Within-Group Plain Mix 7-days |
|---|---|---|
| 1. | Cocamide DEA, .01 + Sulframin, .01 + | 127 |
| 2. | Corn Syrup Solids, .07 + Isopropanolamine, .03 | 151 |
| 3. | Cocamide DEA, .01 + Sulframin, .01 + Corn Syrup Solids, .07 + Isopropanolamine, .03 | 184 |

It is clear from data in Table 9 that best results are secured by the four-component system.

The terms and expressions which have been employed are used as terms of description and not of limitation, with no intention to exclude any equivalents, but it is recognized that various modifications are possible within the scope of the invention claimed.

What is claimed is:

1. A method for increasing the strength of nonplastic hydraulic cement mixes comprising incorporating into a hydraulic cement mix an admixture comprising: an alpha olefin sulfonate; an alkylolamide; an alkanolamine; and glucose or its oligomers through a degree of polymerization characterized by commercial corn syrup, wherein the olefin sulfonate is incorporated into said cement mix at about 0.005 to about 0.5% by weight of cement, and said alkylolamide is incorporated into said cement mix at about 0.005 to 0.5% by weight of cement, and said and said alkanolamine is incorporated into said cement mix at about 0.01 to 0.1% by weight of cement, and said glucose and glucose oligomers are incorporated into said cement mix at about 0.01 to 0.02% by weight of cement.

2. A method for increasing the strength of nonplastic hydraulic cement mixes according to claim 1 wherein the alkylolamide is a cocamide made from coco fatty acid and diethanolamine.

3. A method for increasing the strength of nonplastic hydraulic cement mixes according to claim 1 wherein the alkanolamine component is isopropanolamine.

4. A method for increasing the strength of nonplastic hydraulic cement mixes according to claim 1 wherein the alkanolamine component is diisopropanolamine.

5. A method for increasing the strength of nonplastic hydraulic cement mixes according to claim 1 wherein the alkanolamine component is diethanolamine.

6. A method for increasing the strength of nonplastic hydraulic cement mixes according to claim 1 wherein the alkylolamide is the reaction product of a fatty acid with an alkanolamine selected from the group of monoalkanolamine and dialkanolamine in a concentration in the range of one to two moles per mole of fatty acid.

7. A method for increasing the strength of nonplastic hydraulic cement mixes comprising incorporating into a hydraulic cement mix an admixture comprising: an anionic surfactant selected from the alkanolamine or alkali metal salts of alpha olefin sulfonic acids and alkylarylsulfonic acids, sulfate esters of fatty acids or ethoxylated fatty acids of carbon chain length of the order of about 8 to about 20; and a nonionic surfactant selected from alkylolamides prepared by reaction of a fatty acid amide with ethylene oxide and ethoxylated fatty amines, wherein the anionic surfactant is incorporated into said cement mix at about 0.005% to 0.5% by weight of cement, and the nonionic surfactant is incorporated into said cement mix at about 0.005% to 0.5% by weight of cement.

8. A method for increasing the strength of nonplastic hydraulic cement mixes according to claim 7, wherein the anionic surfactant is the sodium salt of dodecylbenzene sulfonic acid.

9. A method for increasing the strength of nonplastic hydraulic cement mixes according to claim 7, wherein the anionic surfactant is the sodium salt of alpha olefin sulfonic acid.

10. A method for increasing the strength of nonplastic hydraulic cement mixes according to claim 7, wherein the anionic surfactant is an oxyethylated cocomonoamine with a 12-carbon alkyl chain.

11. A method for increasing the strength of nonplastic hydraulic cement mixes according to claim 7, wherein the anionic surfactant is the reaction product of coco fatty acid amide with ethylene oxide.

12. A nonplastic hydraulic cement mix comprising hydraulic cement, aggregate, water and an admixture comprising: (a) the alpha olefin sulfonate; (b) alkylolamide; (c) an alkanolamine; and (d) glucose or its oligomers through a degree of polymerization characterized by commerical corn syrup, wherein the olefin sulfonate is incorporated into said cement mix at about 0.005 to about 0.5% by weight of cement, said alkylolamide is incorporated into said cement mix at about 0.005% to 0.5% by weight of cement, said alkanolamine is incorporated into said cement mix at about 0.01% to 0.1% by weight of cement, and said glucose and glucose oligomers are incorporated into said cement mix at about 0.01% to 0.2% by weight of cement.

13. A nonplastic hydraulic cement mix according to claim 12 wherein the alkylolamide is a cocamide made from coco fatty acid and diethanolamine.

14. A nonplastic hydraulic cement mix according to claim 12 wherein the alkanolamine component is isopropanolamine.

15. A nonplastic hydraulic cement mix according to claim 12 wherein the alkanolamine component is diisopropanolamine.

16. A nonplastic hydraulic cement mix according to claim 12 wherein the alkanolamine component is diethanolamine.

17. A nonplastic hydraulic cement mix according to claim 12 wherein the alkanolamine component is triisopropanolamine.

18. A nonplastic hydraulic cement mix according to claim 12 wherein the alkylolamide is the reaction production of a fatty acid with an alkanolamine selected from the group of monoalkanolamine, and dialkanolamines in a concentration in the range of one to two moles per mole of fatty acid.

* * * * *